(12) United States Patent
Kurtz et al.

(10) Patent No.: US 12,693,476 B2
(45) Date of Patent: Jul. 28, 2026

(54) OPTICAL FIBER SUPPORT STRUCTURE

(71) Applicant: US Conec Ltd., Hickory, NC (US)

(72) Inventors: Daniel Kurtz, Huntersville, NC (US);
Darrell R Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 350 days.

(21) Appl. No.: 17/920,903

(22) PCT Filed: May 4, 2021

(86) PCT No.: PCT/US2021/030674
§ 371 (c)(1),
(2) Date: Oct. 24, 2022

(87) PCT Pub. No.: WO2021/226101
PCT Pub. Date: Nov. 11, 2021

(65) Prior Publication Data
US 2023/0161110 A1    May 25, 2023

Related U.S. Application Data

(60) Provisional application No. 63/019,528, filed on May 4, 2020.

(51) Int. Cl.
G02B 6/36        (2006.01)
G02B 6/38        (2006.01)

(52) U.S. Cl.
CPC ......... G02B 6/3652 (2013.01); G02B 6/3839 (2013.01)

(58) Field of Classification Search
CPC ............................ G02B 6/3652; G02B 6/3839
See application file for complete search history.

(56) References Cited

U.S. PATENT DOCUMENTS

| | | | |
|---|---|---|---|
| 5,446,810 A | 8/1995 | Watanabe et al. | |
| 6,012,852 A | 1/2000 | Kadar-Kallen et al. | |
| 6,377,743 B1 | 4/2002 | Ueda et al. | |
| 7,058,275 B2 | 6/2006 | Sezerman et al. | |
| 7,510,337 B2 | 3/2009 | Takeda et al. | |
| 9,091,822 B2 | 7/2015 | DeMerritt et al. | |
| 9,091,833 B2 * | 7/2015 | Chen ................... | G02B 6/3888 |
| 9,563,027 B2 | 2/2017 | Childers et al. | |
| 10,197,743 B2 | 2/2019 | Childers et al. | |
| 10,222,559 B2 | 3/2019 | Nakama et al. | |

(Continued)

FOREIGN PATENT DOCUMENTS

| | | |
|---|---|---|
| JP | 20090258510 A | 11/2009 |
| JP | 7159791 B2 | 10/2022 |

OTHER PUBLICATIONS

Search Report, EP 21 799979.6, dated Apr. 10, 2024.

(Continued)

*Primary Examiner* — Tina Wong
(74) *Attorney, Agent, or Firm* — Michael L Leetzow PLLC

(57)        ABSTRACT

An optical fiber support structure for an optical fiber includes a substrate having a groove configured to receive the optical fiber and running lengthwise generally parallel to the optical fiber and at least two projections from the substrate and into the groove, each of said at least two projections including a surface to receive the optical fiber. The optical fiber support structures may also be included in a fiber optic ferrule. There may also be a plurality of optical fiber openings included with the fiber optic ferrule.

17 Claims, 14 Drawing Sheets

(56)                References Cited

U.S. PATENT DOCUMENTS

| | | | |
|---|---|---|---|
| 10,409,007 | B2 | 9/2019 | Kadar-Kallen et al. |
| 10,564,365 | B2 | 2/2020 | Maruyama et al. |
| 10,585,248 | B2 | 3/2020 | Childers et al. |
| 10,620,387 | B2 | 4/2020 | Bushnell et al. |
| 10,698,165 | B2 | 6/2020 | Kadar-Kallen et al. |
| 11,125,950 | B2 | 9/2021 | Watanabe et al. |
| 11,467,352 | B2 | 10/2022 | Nakama et al. |
| 2011/0091167 | A1 | 4/2011 | Nishimura |
| 2012/0093462 | A1* | 4/2012 | Childers .............. G02B 6/4403 385/33 |
| 2013/0168537 | A1 | 7/2013 | Shin |
| 2014/0133805 | A1 | 5/2014 | Lin |
| 2014/0178013 | A1* | 6/2014 | Nielson ................ G02B 6/3861 385/83 |
| 2015/0247983 | A1* | 9/2015 | Ohmura ................ G02B 6/3885 385/76 |
| 2017/0146748 | A1 | 5/2017 | Childers et al. |
| 2017/0160485 | A1 | 6/2017 | Wan |
| 2017/0184793 | A1 | 6/2017 | Watanabe et al. |
| 2018/0128991 | A1* | 5/2018 | Vallance .............. G02B 6/3862 |
| 2018/0239092 | A1 | 8/2018 | Childers et al. |
| 2018/0267251 | A1 | 9/2018 | Childers |
| 2019/0079253 | A1* | 3/2019 | Koumans ............. G02B 6/3652 |
| 2020/0103597 | A1 | 4/2020 | Watanabe et al. |
| 2020/0264386 | A1 | 8/2020 | Hodge et al. |
| 2022/0137303 | A1 | 5/2022 | Otomitsu et al. |
| 2022/0146758 | A1 | 5/2022 | Childers et al. |
| 2022/0390684 | A1 | 12/2022 | Kurtz et al. |

OTHER PUBLICATIONS

International Search Report, 3 pages; Jul. 13, 2021.
Translation of JP7159791.
Written Opinion of the ISA; Jul. 13, 2021; 7 pages.
Translation of 20090258510—same as 2008-109375.

* cited by examiner

OPTICAL FIBER SUPPORT STRUCTURE

REFERENCE TO RELATED CASE

This application claims priority under 35 U.S.C. § 119 (e) to U.S. provisional application No. 63/019,528 filed on May 4, 2020, the contents of which are hereby incorporated by reference in their entirety.

BACKGROUND OF THE INVENTION

Optical fibers are used as an optical transport medium in various communications scenarios. In some cases, they are mated to other optical fibers, while in some cases, they are aligned to a transceiver that transmits and receives the optical output to and from the optical fibers. When mated with other optical fibers, the optical fibers need to be precisely positioned and aligned due to the micrometer level dimensions of the output beam profile and of the optical fibers.

Optical fibers may be supported by a silicon or a glass substrate having a groove-like structure upon which the optical fibers are placed and an adhesive applied to secure the optical fibers within the substrate. Such groove-like structures may include V-grooves or U-grooves, such as the one shown in U.S. Pat. No. 7,058,275 assigned to Oz Optics of CA. Alternatively, optical fibers are commonly used in fiber optic ferrules that have cylindrical openings into which the optical fibers are inserted from the rear of the fiber optic ferrules. These fiber optic ferrules may be single fiber or multi-fiber, and typically mated to other ferrules. In certain cases, these fiber optic ferrules may be aligned to on-board optics that bi-directionally transfer the optical beam between the fiber optic ferrule and the transceiver. Certain fiber optic ferrules may utilize groove-like structures too, and the optical fibers are typically placed in these grooves and an adhesive is applied to secure the optical fibers. However, such fiber optic ferrules with grooves do not have any optical fiber openings associated with conventional MT or lensed ferrules. Additionally, mechanical forces applied through a cap may be used to push the optical fibers toward the base of the grooves.

Each of the optical fiber openings in a ferrule material, and grooves in glass or silicon, have their own set of challenges in manufacturing from a precision and tolerance perspective. In the case of multi-fiber groove support structures, such as V-grooves, a uniform pair of angled opposing surfaces has to be created throughout the length of the V-groove support structure. Similar issues exist for U-grooves. Typically, making V-grooves involves processes such as etching (when the V-groove is in Silicon) or the use of a diamond disc (when the structure is on a glass substrate). Further, due to the inherent crystal structure of silicon, the optimal angle between the opposing surfaces of the V-groove is 54.6°. However, with glass, this angle is typically 60°. This may lead to misalignment when the optical transport utilizes both, one side being a glass ferrule, and the other side being a silicon substrate.

When V-grooves are used in ferrules, the contact of the optical fibers with the ferrule material creates a depression on the walls of the V-grooves in the ferrule material that is dependent on the force that is applied to the optical fibers when placed in the grooves. This occurs due to the difference in the optical fiber and ferrule material, and creates potential misalignment of the optical fibers during mating with other optical fibers.

In the case of fiber openings inside the fiber optic ferrule, they need to have uniform diameters throughout the length to ensure proper insertion and subsequent positioning of the optical fibers therein. Measuring such uniformity of the fiber openings is challenging and cumbersome and may be error prone.

SUMMARY OF THE INVENTION

According to one aspect, the present invention is directed to an optical fiber support structure for an optical fiber that includes a substrate having a groove configured to receive the optical fiber and running lengthwise generally parallel to the optical fiber, and at least two projections from the substrate and into the groove, each of said at least two projections including a surface to receive the optical fiber.

In some embodiments, the at least two projections comprise six projections, the projections being spaced from one another in a lengthwise direction, a lateral direction, or both.

In some embodiments, the at least two projections have a curved surface directed toward the groove.

In some embodiments, the curved surface on each of the at least two projections have a curvature that is the same as that of the optical fiber.

In yet another aspect, there is a fiber optic ferrule for receiving a plurality of optical fibers in a plurality of optical fiber support structures that includes a main body extending between a front end and a rear end, the main body having a top surface and a bottom surface, a longitudinal axis extending between the front end and the rear end and parallel to the plurality of optical fiber support structures, the plurality of support structures being disposed in the main body, each of the plurality of support structures have a groove and being generally parallel to the longitudinal axis of the ferrule and each being configured to receive an optical fiber, and a plurality of fiber openings, a respective one of the plurality of fiber openings is aligned with a respective one of the plurality of optical fiber support structures and rearward thereof, each of the plurality of fiber openings having an tubular configuration to accept the optical fibers insertable from the rear end of the ferrule and onto a respective one of the plurality of optical fiber support structures.

In some embodiments, the each of the grooves includes at least two projections extending into the groove, each of said at least two projections including a surface to receive the optical fiber.

In some embodiments, there is a chamfered surface for each of the plurality of support structures disposed between respective ones of the fiber openings and each of the plurality of support structures.

In yet another aspect, there is a fiber optic ferrule made of an optically clear material that includes a main body of optically clear material extending between a front end and a rear end, the main body having a top surface and a bottom surface, a plurality of optical fiber support structures in the main body and having a longitudinal axis extending between the front end and the rear end and parallel to the plurality of optical fiber support structures, each of the plurality of optical fiber support structures further comprising a groove in the optically clear material, each of the grooves configured to receive optical fiber therein, each of the grooves running lengthwise between the front end and rear end and at least two projections provided in a front half of each of the grooves, each of said at least two projections including a surface to receive the optical fiber.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
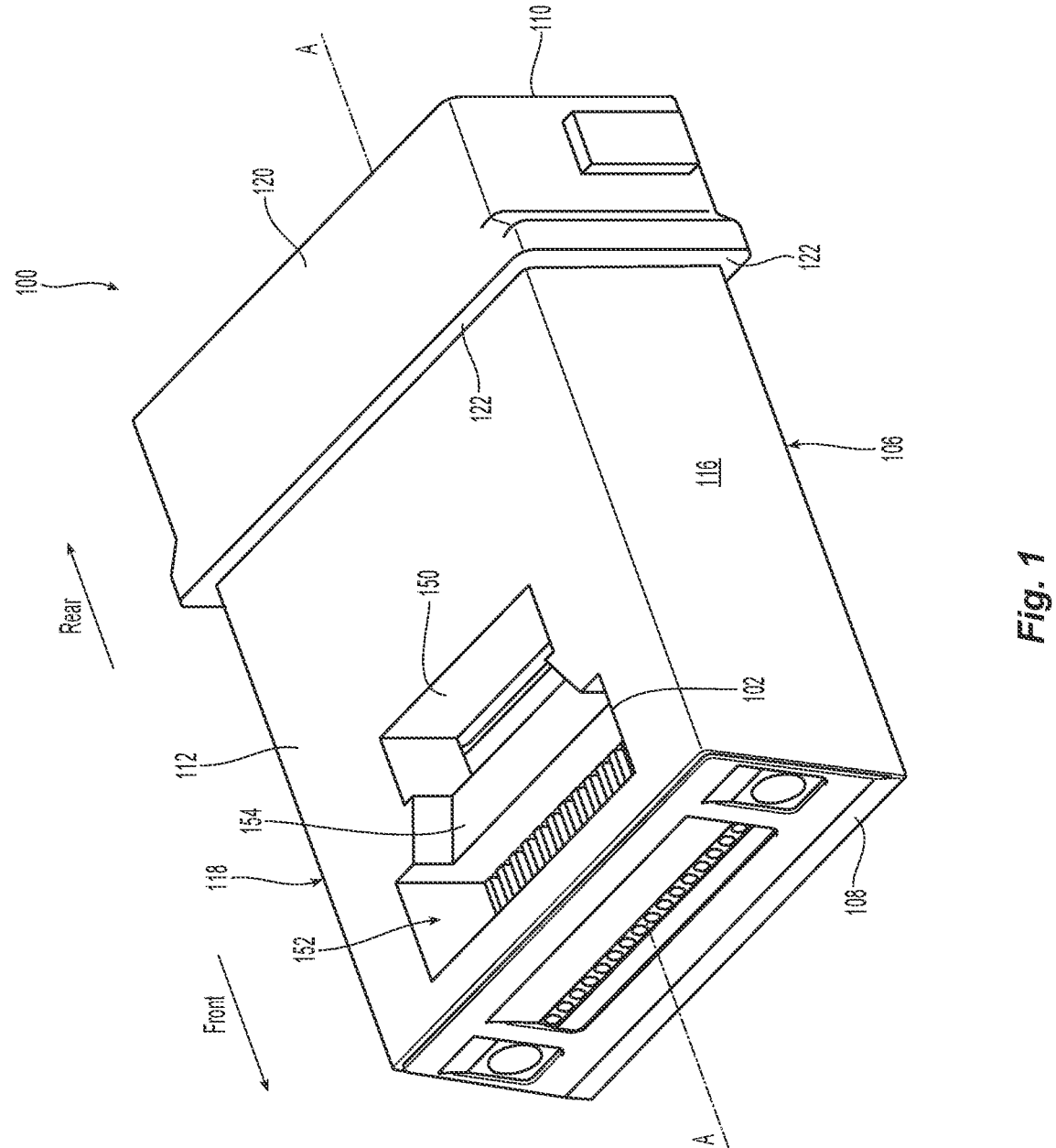
FIG. 1 is a perspective view of one embodiment of a fiber optic ferrule having an optical fiber support structure for an optical fiber according to the present invention.
Figure 2:
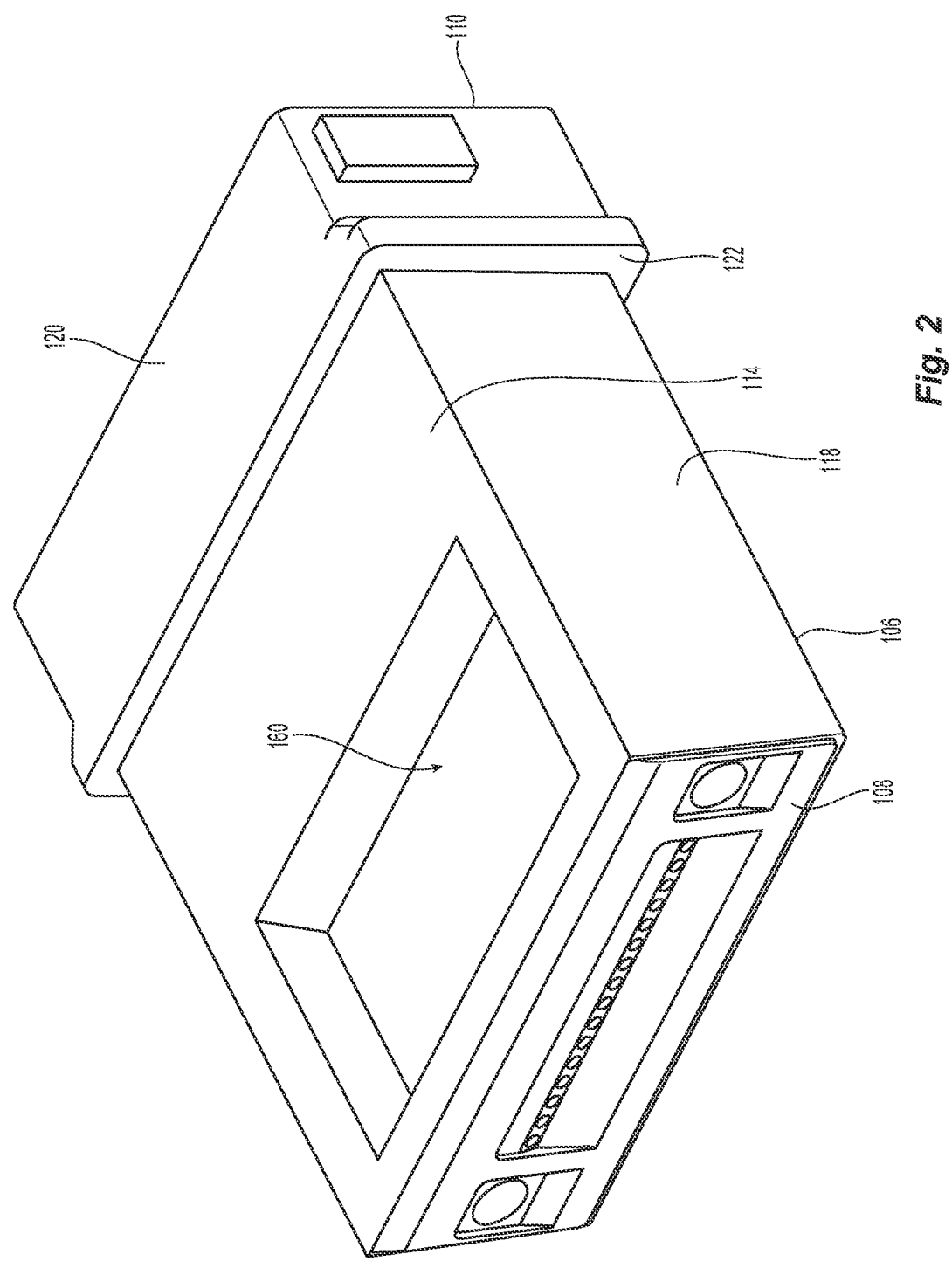
FIG. 2 is a bottom side perspective view of the fiber optic ferrule in FIG. 1.
Figure 3:
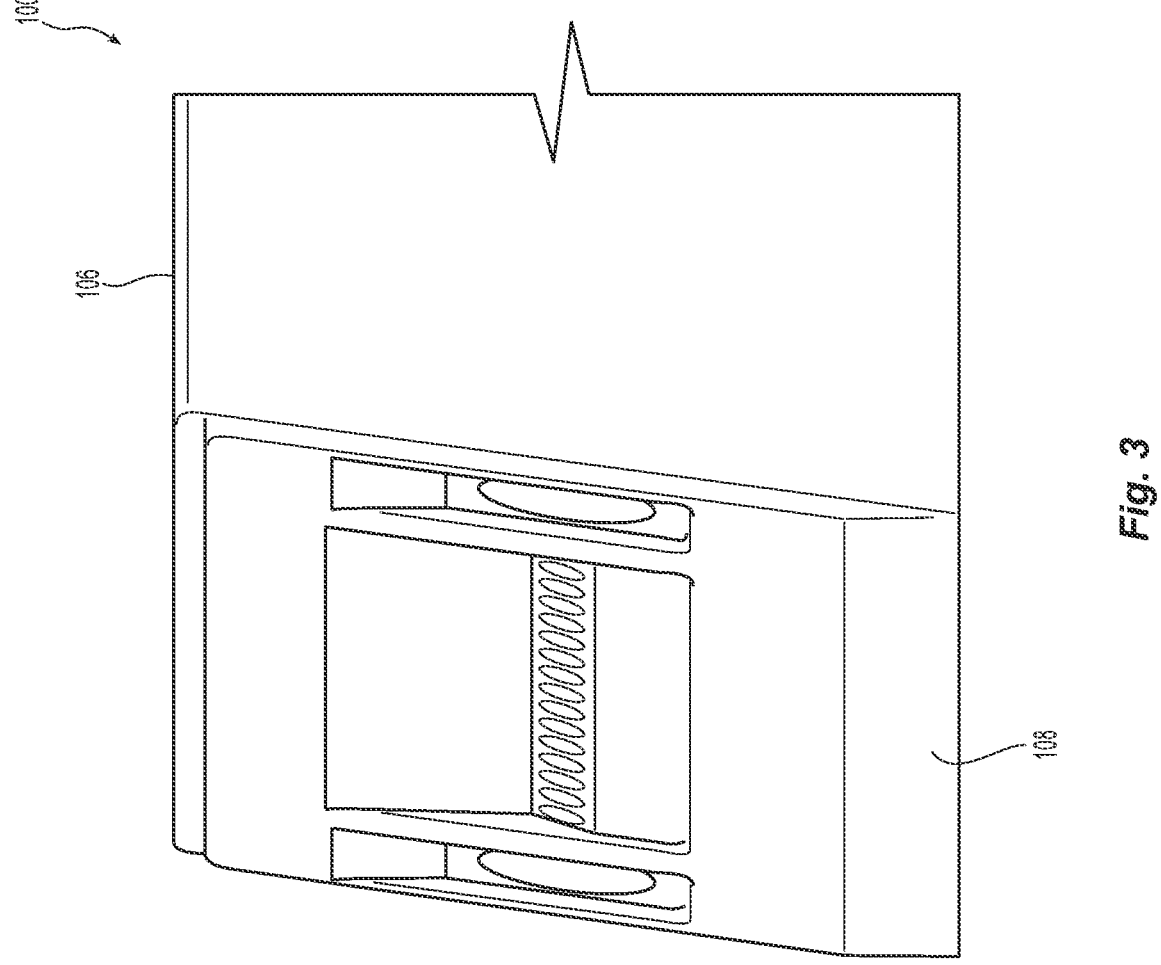
FIG. 3 is a perspective view of the front face of the fiber optic ferrule in FIG. 1.
Figure 4:
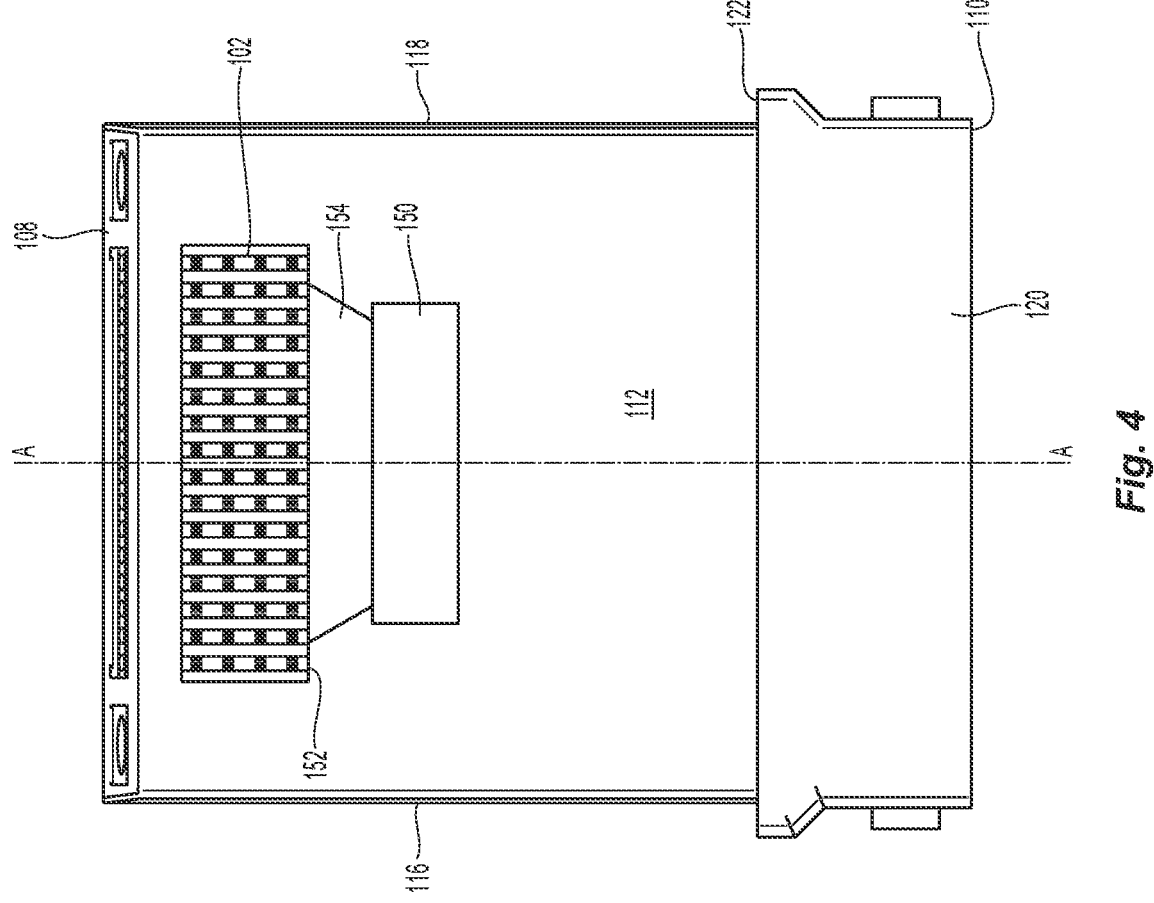
FIG. 4 is a top plan view of the fiber optic ferrule in FIG. 1.
Figure 5:
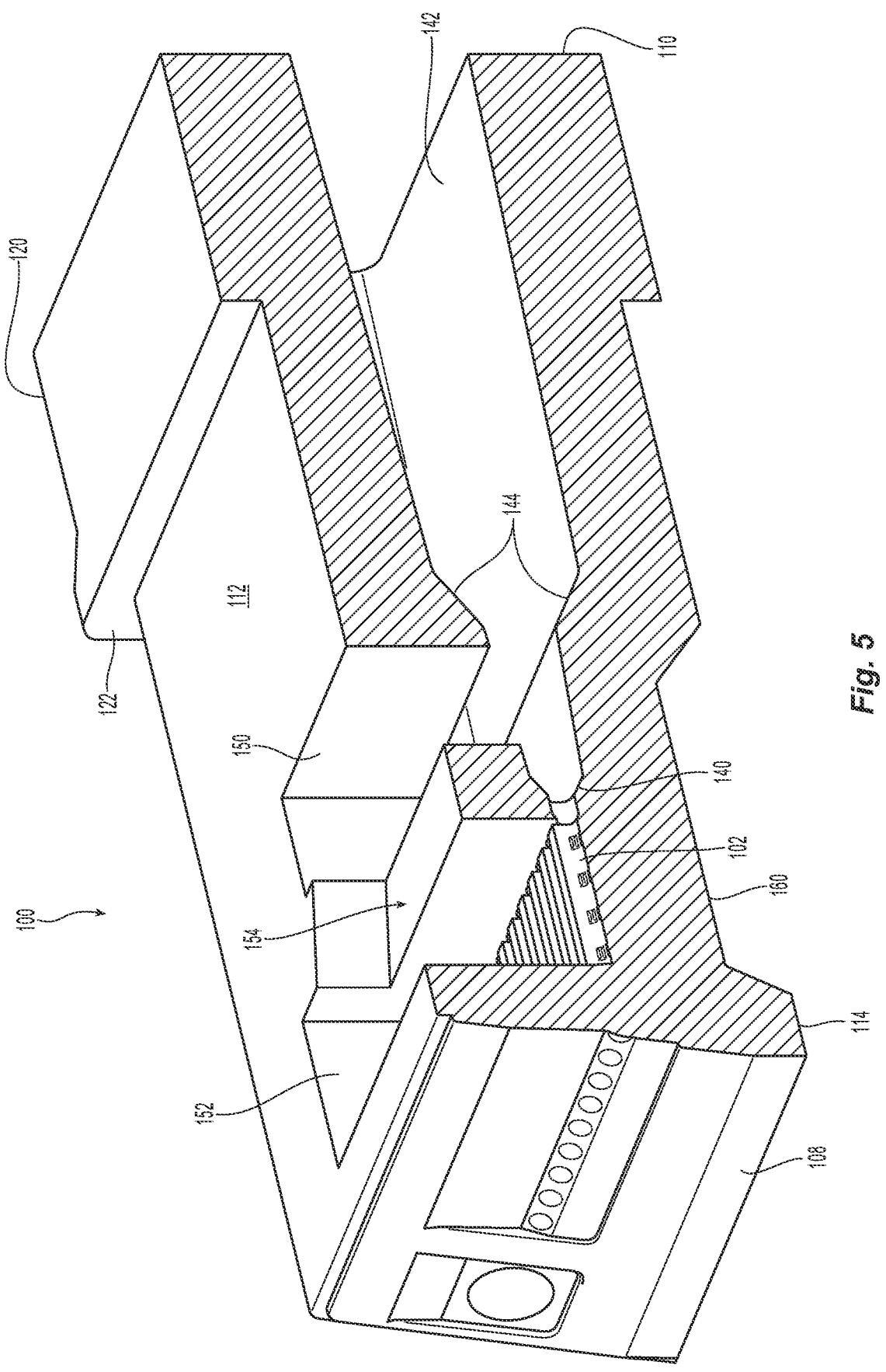
FIG. 5 is a perspective view from the front left of a cross sectional view of the fiber optic ferrule in FIG. 1.
Figure 6:
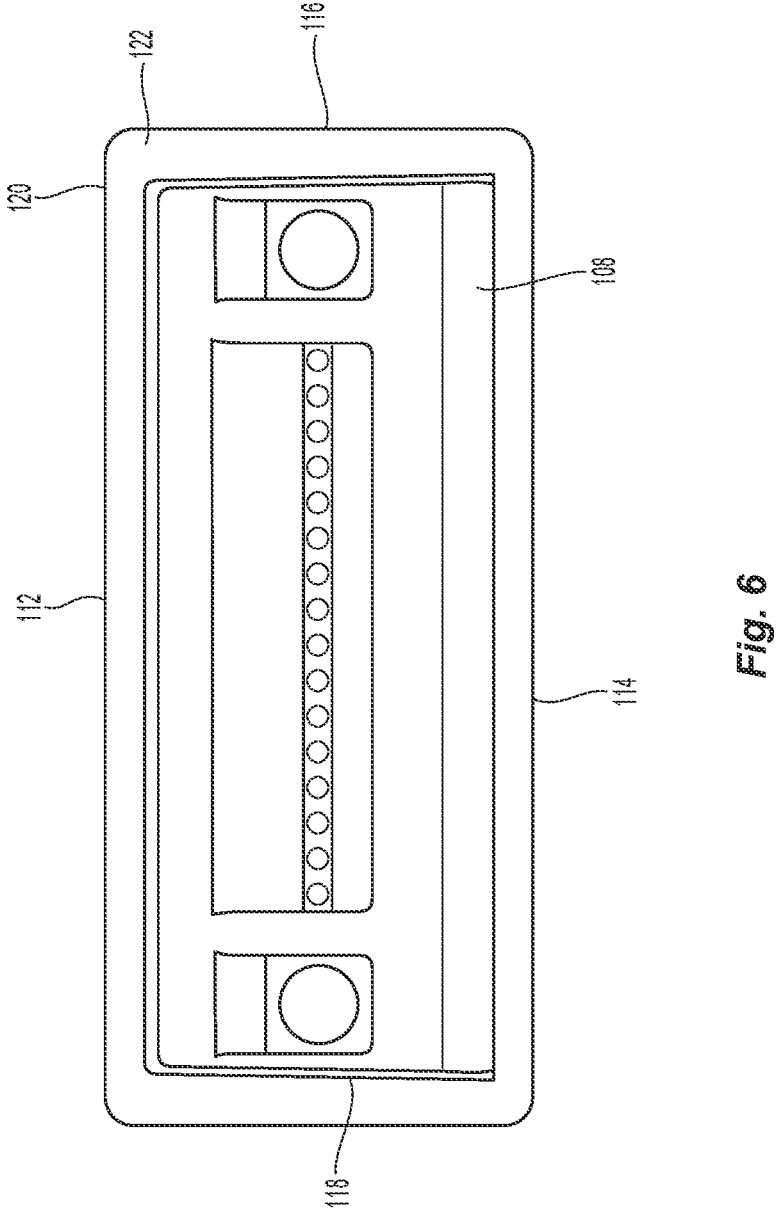
FIG. 6 is a front elevation view of the fiber optic ferrule in FIG. 1.
Figure 7:
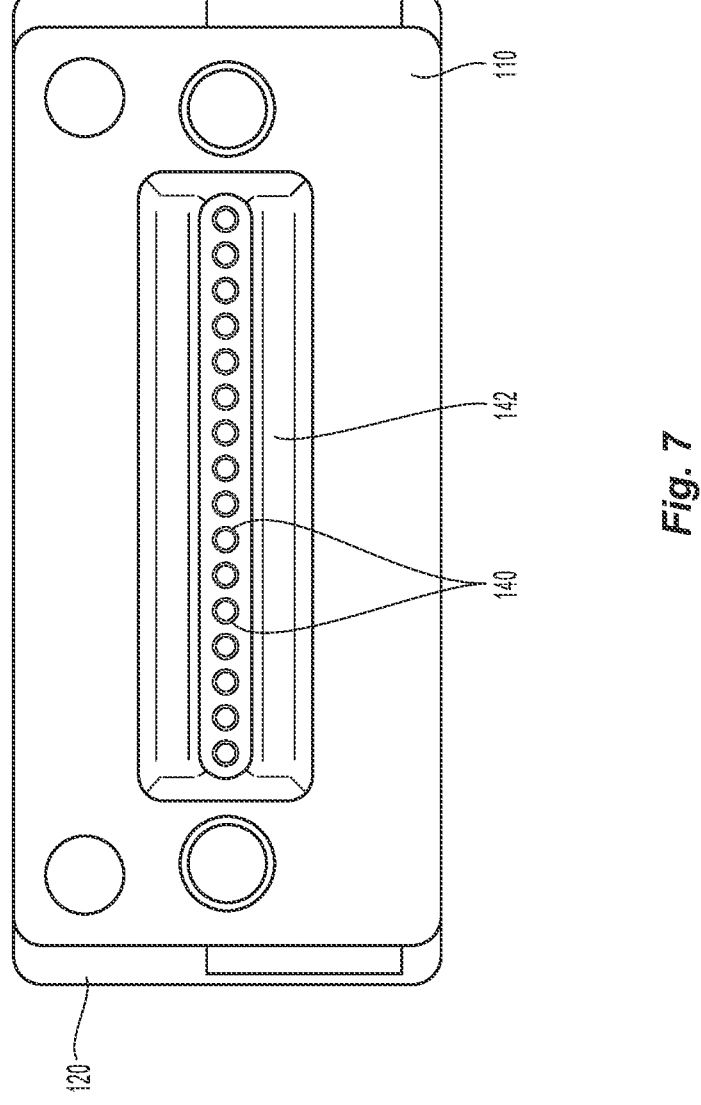
FIG. 7 is a rear elevation view of the fiber optic ferrule in FIG. 1.
Figure 8:
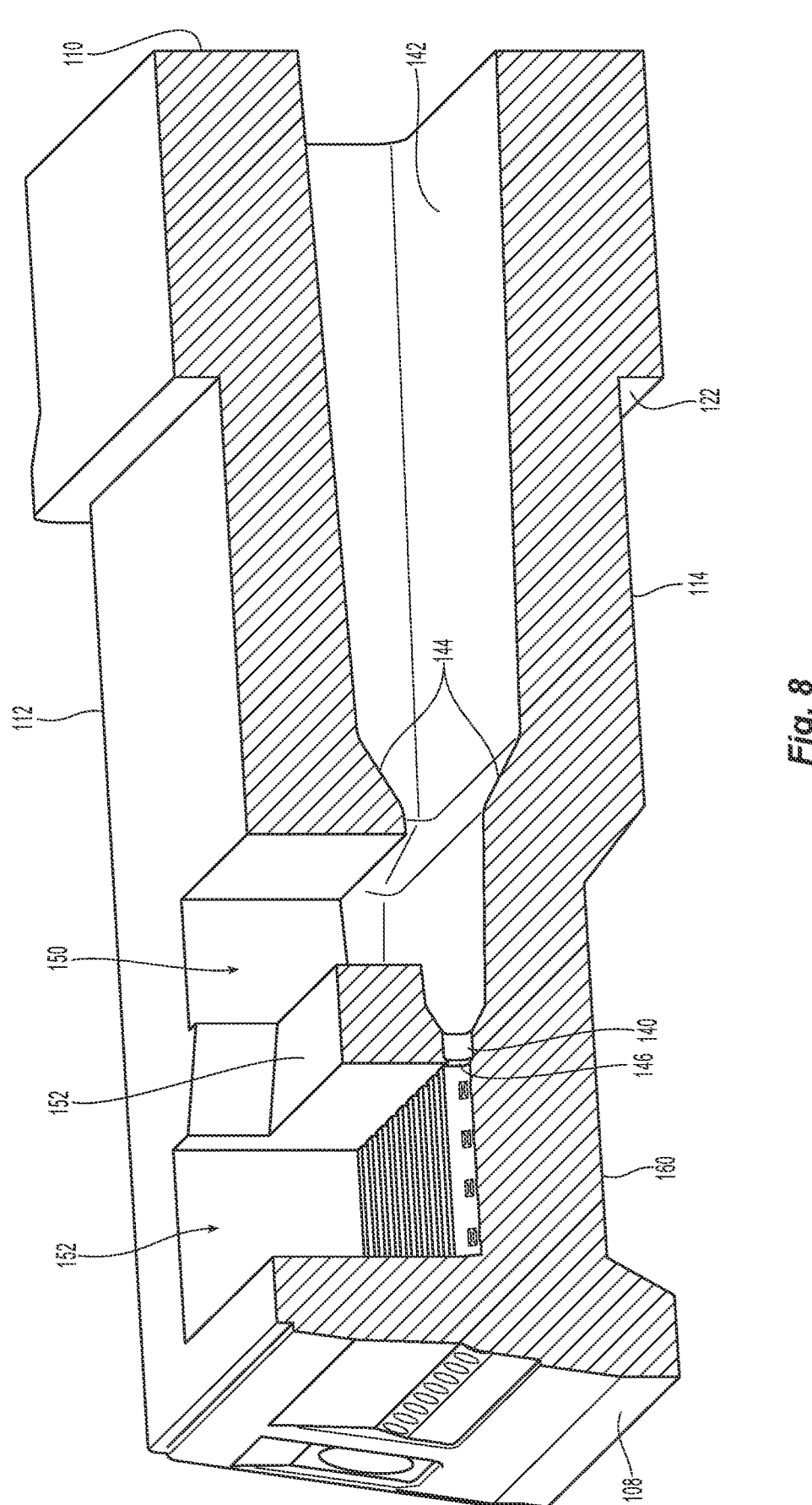
FIG. 8 a perspective view from the front left of a cross sectional view of the fiber optic ferrule in FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Illustrated in FIGS. 1-11 is one embodiment of a fiber optic ferrule 100 having a plurality of optical fiber support structures 102 (see, e.g., FIGS. 4-5, 7-9) for an optical fiber 104 (see FIG. 11) according to the present invention. The fiber optic ferrule 100 has a main body 106 extending between a front end 108 and a rear end 110. The main body 106 also has a top surface 112, a bottom surface 114 and two side surfaces 116,118 extending between the top surface 112 and the bottom surface 114. The fiber optic ferrule 100 also has a circumferential portion 120 that extends around the rear end 110 of the main body 106 and creates a shoulder 122. The fiber optic ferrule 100 may also be shoulder-less. The term shoulder-less referring to a lack of any protrusions or other features on the side surfaces that may be used to engage the multi-fiber ferrule 100 with a receptacle or an adapter. Thus, the circumferential portion 120 would not be present in such a fiber optic ferrule The main body 106 also includes a longitudinal axis A extending between the front end 108 and the rear end 110 and parallel to the plurality of optical fiber support structures 102. The plurality of support structures 102 are disposed in the main body 106 and have a groove 124. As can be seen in FIGS. 1, 4, 5, 8 and 10, they are generally parallel to the longitudinal axis A of the fiber optic ferrule 100 and each is configured to receive an optical fiber 104.

Applicant notes that the term "front" or "forward" means that direction where the fiber optic ferrule would meet with another fiber optic ferrule or device, while the term "rear" or "rearward" is used to mean the direction from which the optical fibers enter into the fiber-optic ferrule or fiber optic connector. In the present application, the fiber optic ferrule 100 will therefore have a front and a rear. Thus, in FIG. 1, the "front" of the fiber optic ferrule 100 is on the left side of the figure and pointing out of the figure. The "rear" or "back" is that part of the fiber optic ferrule 100 that is on the right side of the page and "rearward" and "backward" is toward the right and into the page.

The plurality of support structures 102 are each generally an open-top groove that extends parallel to the longitudinal axis A. See FIGS. 4, 5, and 8-11. Each groove of the plurality of support structures 102 could be a v-shaped, u-shaped, or other configuration and still fall within the scope of the present invention. Thus, there is a space 130 that is formed by the walls 132 to receive the optical fiber 104 in the groove. A u-shaped groove is illustrated in the figures, and thus has a continuous wall. If the plurality of support structures 102 were formed by a v-shaped groove, then there would be at least two walls. Similarly, if the groove had a polygonal shape, there may be more than 2 walls. All of these configurations are covered herein. Further, while the plurality of support structures 102 are illustrated as being in a fiber optic ferrule 100, but could be made of other materials (glass, silicon, etc.) and disposed in other structures.

In one aspect, the fiber support structures 102 may be provided on a substrate. Basically, the substrate would have geometry similar to the view of the fiber optic ferrule 100 shown in FIG. 10. The substrate may be made of glass, silicon, or other materials. Since other structures on such a substrate will be similar to the structures described herein of the fiber optic ferrule 100, one of ordinary skill in the art after reading this disclosure will understand that the discussion of the fiber optic ferrule 100 is applicable to such a substrate, albeit with a different footprint or geometry than the fiber optic ferrule 100.

A plurality of projections 134 extend into the space 130 from the walls 132. See, e.g., FIG. 9. While the plurality of projections 134 may be formed at the same time as the rest of the fiber optic ferrule 100, they may be added later. Again, the plurality of projections may be formed on a substrate rather than inside the fiber optic ferrule 100. Additionally, the plurality of projections 134 may be formed by the removal of material when creating the plurality of support structures 102. Each of the plurality of projections 134 may also have a curved surface 136 directed toward the space 130 of the plurality of support structures 102. The curved surface 136 preferably has a radius of curvature that matches the optical fibers 104. As a result, the optical fibers 104 may be positioned more accurately inside the space 130 than standard V-grooves or u-grooves without any of the plurality of projections 134. However, it is possible that the radius of curvature is larger, but preferably not smaller than that radius of curvature. Further, other geometries of the plurality of projections 134 (e.g., a convex bump) may be utilized as an alternative.

Figure 9:
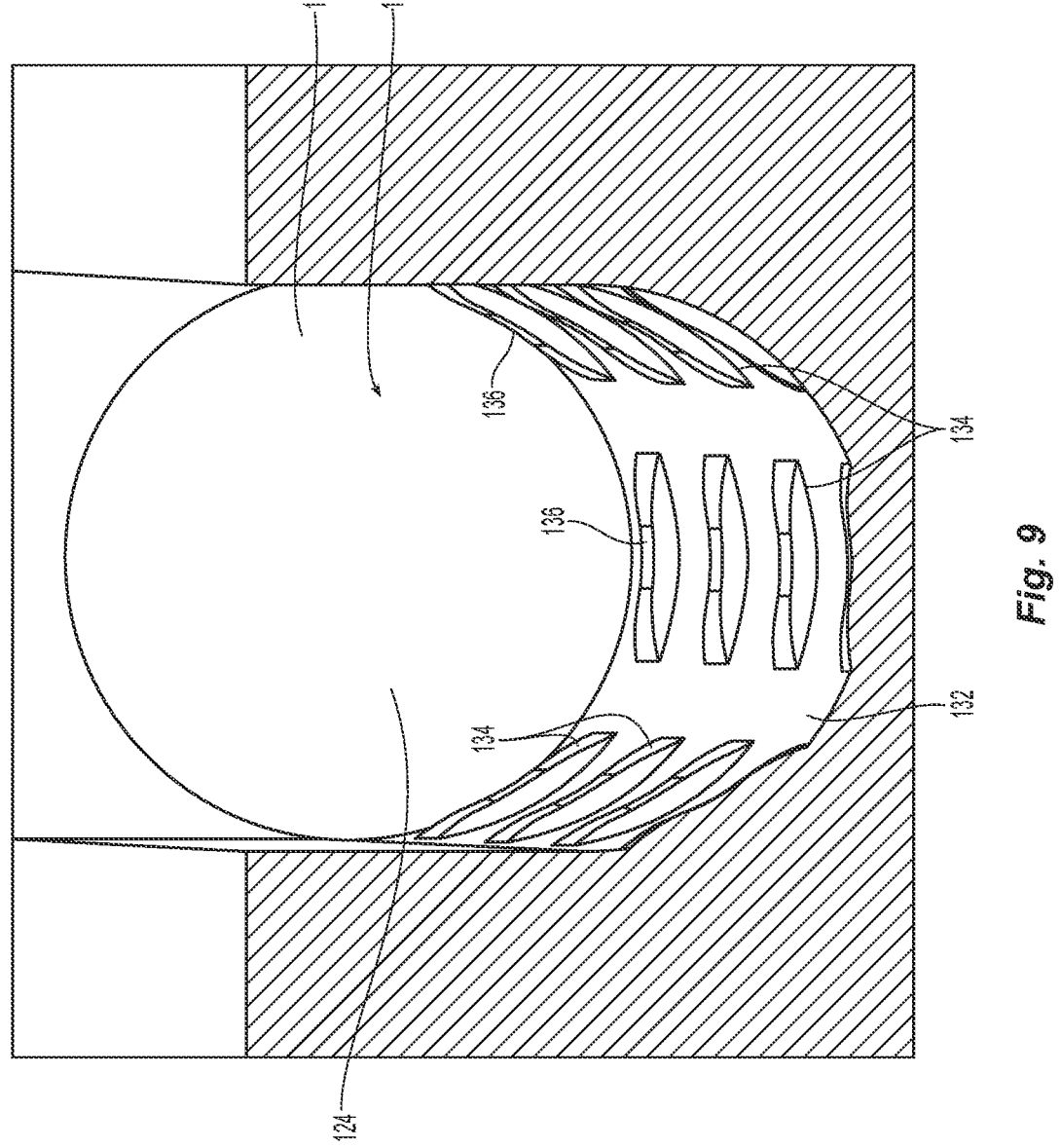
FIG. 9 is a partial view of cross section of the optical fiber support structure and projections in the fiber optic ferrule in FIG. 1.
Figure 10:
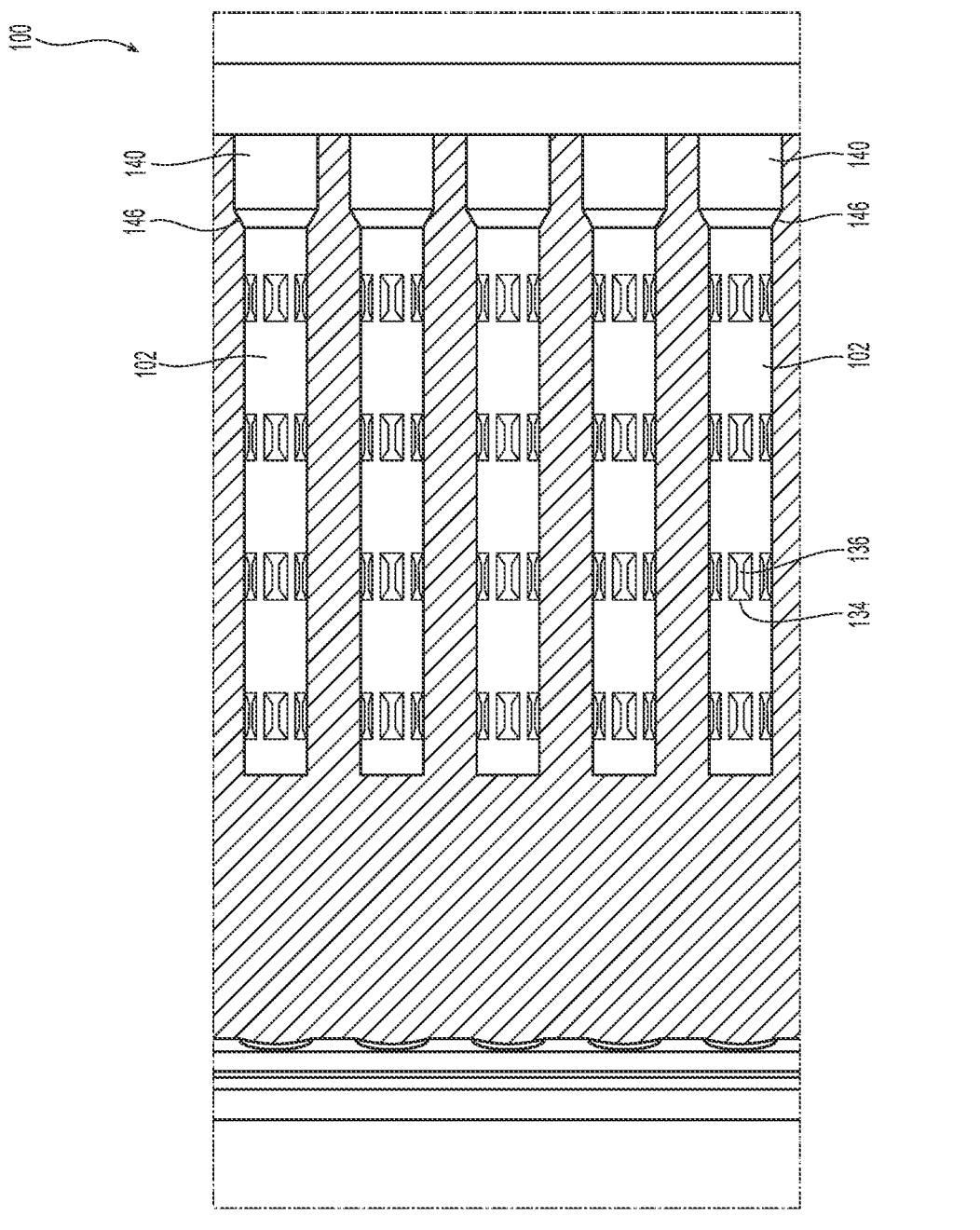
FIG. 10 is a top elevational view of a portion of fiber optic ferrule in FIG. 1.
Figure 11:
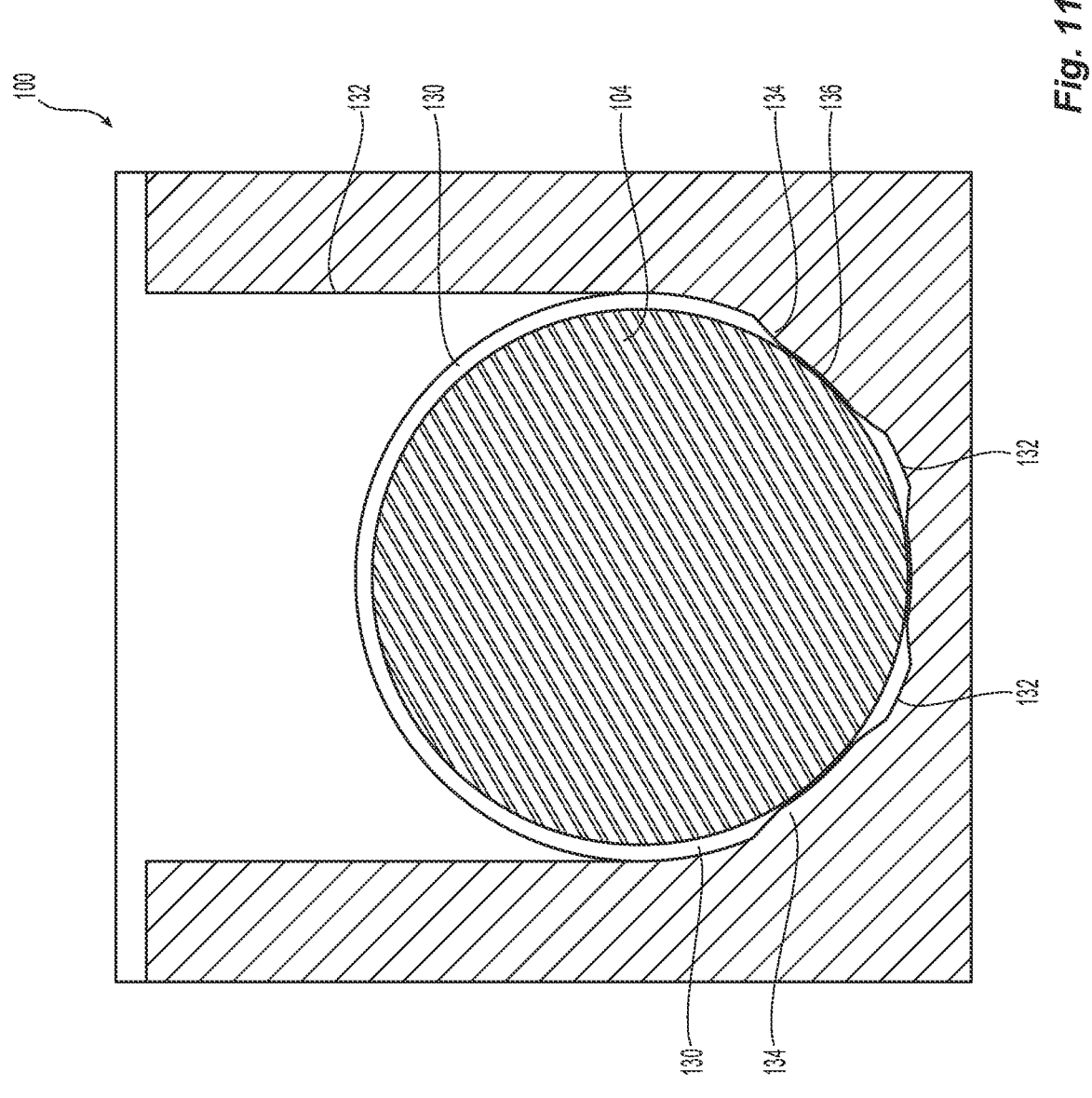
FIG. 11 is a view of cross section of the optical fiber support structure and projections supporting an optical fiber in the fiber optic ferrule in FIG. 1.

The plurality of projections 134 are preferably aligned in both a longitudinal direction as well as an orthogonal direction. That is, the longitudinal direction is parallel to the longitudinal axis A through the main body 106. So, as illustrated in FIG. 9, the view is a longitudinal view down (or, up) one of the plurality of support structures 102 and shows the plurality of projections 134 are in line. Additionally, the plurality of projections 134 are preferably aligned around the walls 132 in an orthogonal direction. See also FIG. 10, where there are number (three as an example) of the plurality of projections 134 aligned in a row from top to bottom on the page. The plurality of projections 134 could be aligned in other directions or not have any planned alignment at all. Moreover, it should be noted that a distal end is toward the front end 108 and the proximal end is toward the rear end 110. So the plurality of projections 134 on the left side of FIG. 10 are at the distal end and those on the right side are at the proximal end. Further, while FIG. 10 shows four triplets of the plurality of projections 134, there may be only one, only two, only three, or more than four sets of the plurality of projections 134. For example, there may be six projections, the projections being spaced from one another in a lengthwise direction, a lateral direction, or both. Similarly, only one group of the plurality of projections provided at a distal end or in the front half of the fiber support structure 102 to receive the optical fibers 104. Furthermore, there are at least two projections 134 into the groove although triplets are shown. For example, in FIG. 11, the fiber may rest on only two such projections 134 (the central projection 136 being absent).

The fiber optic ferrule 100 also includes a plurality of fiber openings 140, a respective one of the plurality of fiber openings 140 is aligned with a respective one of the plurality of optical fiber support structures 102. The fiber openings 140 are rearward of the optical fiber support structures 102 but not at the rear end 110. In fact, there may be a larger, rear singular opening 142 extending from the rear end 110 towards the front end 108 that provides access to the plurality of fiber openings 140. See FIGS. 5 and 8. The rear singular opening 142 may have some chamfered surfaces 144 that reduce the size of the rear singular opening 142 to assist with the alignment of the optical fibers 104 and prevent the skiving of the optical fibers on the interior of the fiber optic ferrule 100. The fiber openings 140 assist in aligning and guiding the optical fibers 104 into the optical fiber support structures 102 from the rear singular opening 142. Each of the plurality of fiber openings 140 preferably has a tubular configuration to accept the optical fibers 104 insertable from the rear end 110 of the fiber optic ferrule 100 and onto a respective one of the plurality of optical fiber support structures 102. (See FIG. 10). The configuration of the plurality of fiber openings 140 may also take other configurations such as oval, polygonal, etc., and still be tubular. The fiber openings 140 may have one or more chamfered areas 146 to reduce the size of the fiber openings 140 and assist in centering the optical fiber 104 into the optical fiber support structures 102. In one aspect of this disclosure, each of the fiber openings is directly behind and terminating at a proximal end of the optical fiber support structures 102. The chamfered areas 146 may or may not be present, and when present, generally have a circular profile similar to a circular profile of the fiber openings 140. In this respect, the combination of the fiber openings 140 and optical fiber support structures 102 forms a hybrid support structure, whether present inside the fiber optic ferrule 100 or on a substrate material—the term "hybrid" referring to the combination structure, as opposed to only the conventional fiber openings being present, or only a v-groove or a u-groove being present to receive optical fibers 104.

The fiber optic ferrule 100 also has a number of windows in the top surface 112. The first window 150 is an epoxy window and allows for the introduction of epoxy into at least a portion of the rear singular opening 142 to secure the optical fibers 104 into the fiber optic ferrule 100. See FIGS. 5 and 8. The epoxy can be either light or heat cured. There is a second window 152 that is more like a well and that allows access to the optical fibers 104 that are disposed within the optical fiber support structures 102. The second window 152 is closer to the front end 108 of the fiber optic ferrule 100. There is a divider wall 154 that is between the first window 150 and the second window 152 that is a bit recessed from the top surface 112. However, it could extend up to the top surface 112 if so desired. If the first window 150 is filled with epoxy first, the epoxy could spill over the divider wall 154 and into the second window 152. The epoxy could be added to the second window 152 first or after first window 150 without it running over the divider wall 154. The fiber openings 140 are directly underneath the divider wall 154. See also FIG. 4.

The fiber optic ferrule 100 may have a recessed portion 160 in the bottom surface 114. This recessed portion is not critical to the operation or the molding of the fiber optic ferrule, but does reduce the amount of material used. It should be noted that the fiber optic ferrule 100 is preferably made of an optically clear or translucent material. Alternatively, the fiber optic ferrule 100 may be made of opaque material. The front end 108 of the fiber optic ferrule 100 may have a design of the Lensed Fiber Optic Ferrule disclosed in PCT/US2020/058794, which is owned by the current applicant.

Figure 12:
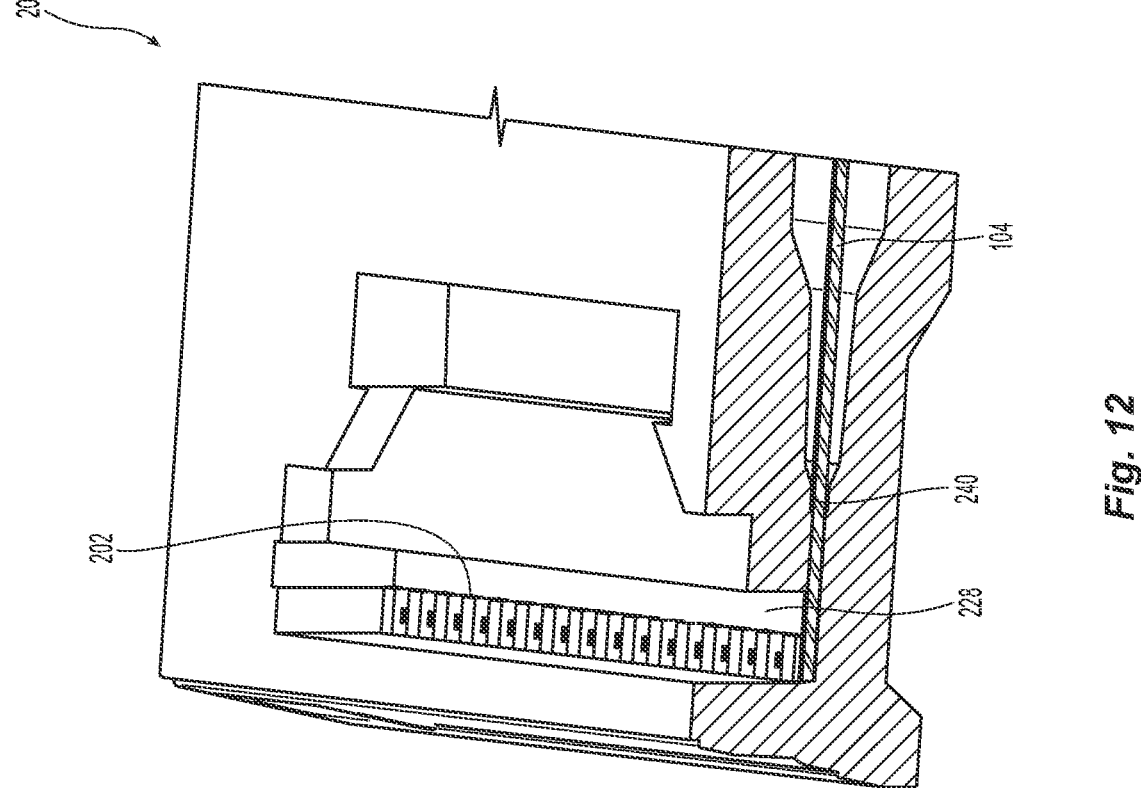
FIG. 12 is a perspective view of another embodiment of a fiber optic ferrule having an optical fiber support structure for an optical fiber according to the present invention.

Another embodiment of a fiber optic ferrule 200 having a plurality of optical fiber support structures 202 for an optical fiber 104 according to the present invention is illustrated in FIG. 12. In this fiber optic ferrule 200, there are a plurality of optical fiber support structures 202 as discussed above with relation to fiber optic ferrule 100. There are also a plurality of fiber openings 240, a respective one of the plurality of fiber openings 240 is aligned with a respective one of the plurality of optical fiber support structures 202. While in this embodiment, the fiber openings 240 are rearward of the optical fiber support structures 202, each of the plurality of optical fiber support structures 202 are separated from a respective one of the plurality of fiber openings 240 by an epoxy space 228. The epoxy space 228 allows for the epoxy to get between the optical fibers 104 (while only one is illustrated, there may be as many as 4-16 optical fibers). There would also be more contact by the epoxy with the optical fibers 104 and within the epoxy space 228. The remainder of the fiber optic ferrule 200 would be the same as discussed above for fiber optic ferrule 100.

Figure 13:
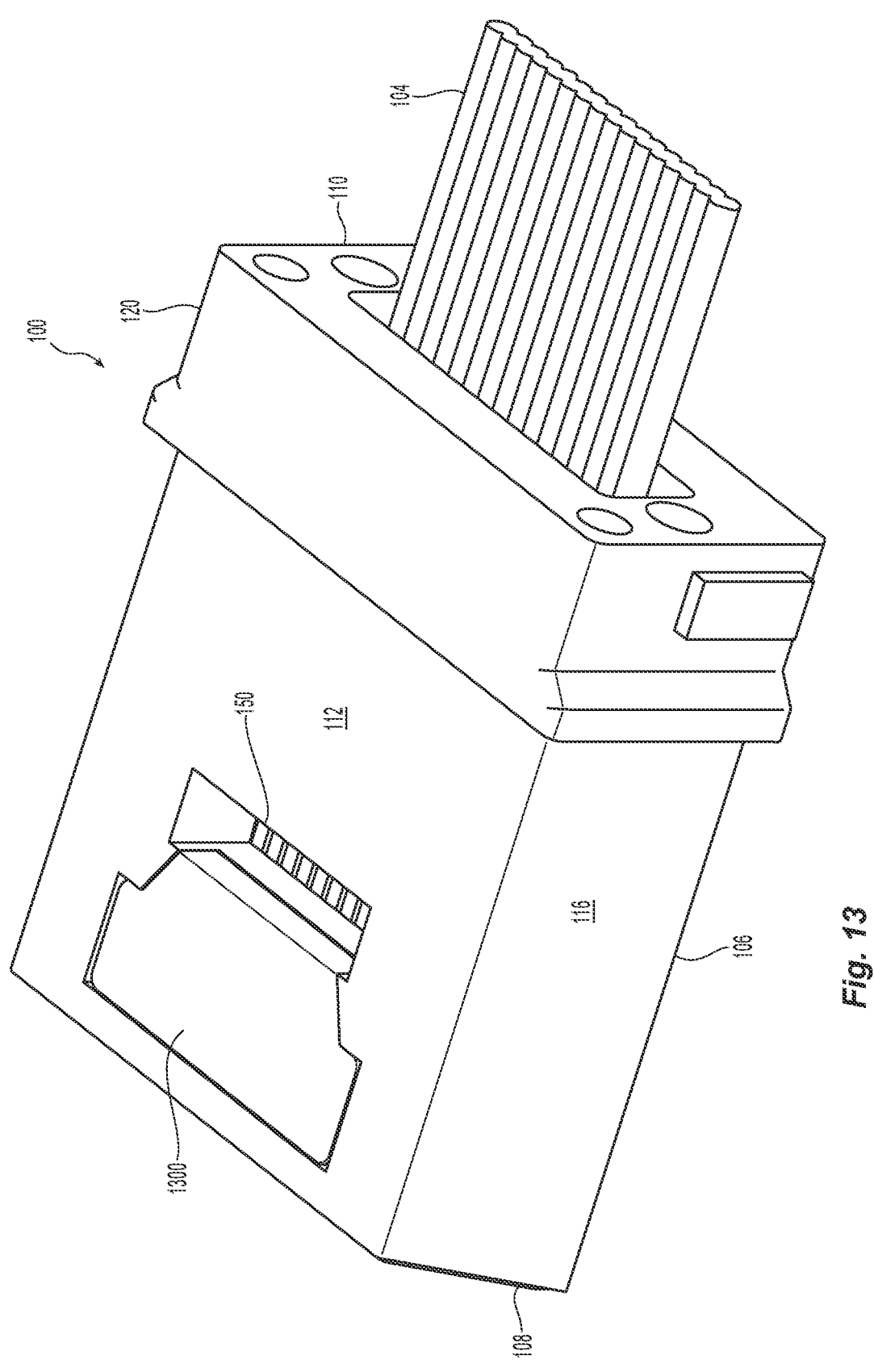
FIG. 13 is a view of a plug attached to a window of the fiber optic ferrules of FIG. 1 or 12.
Figure 14:
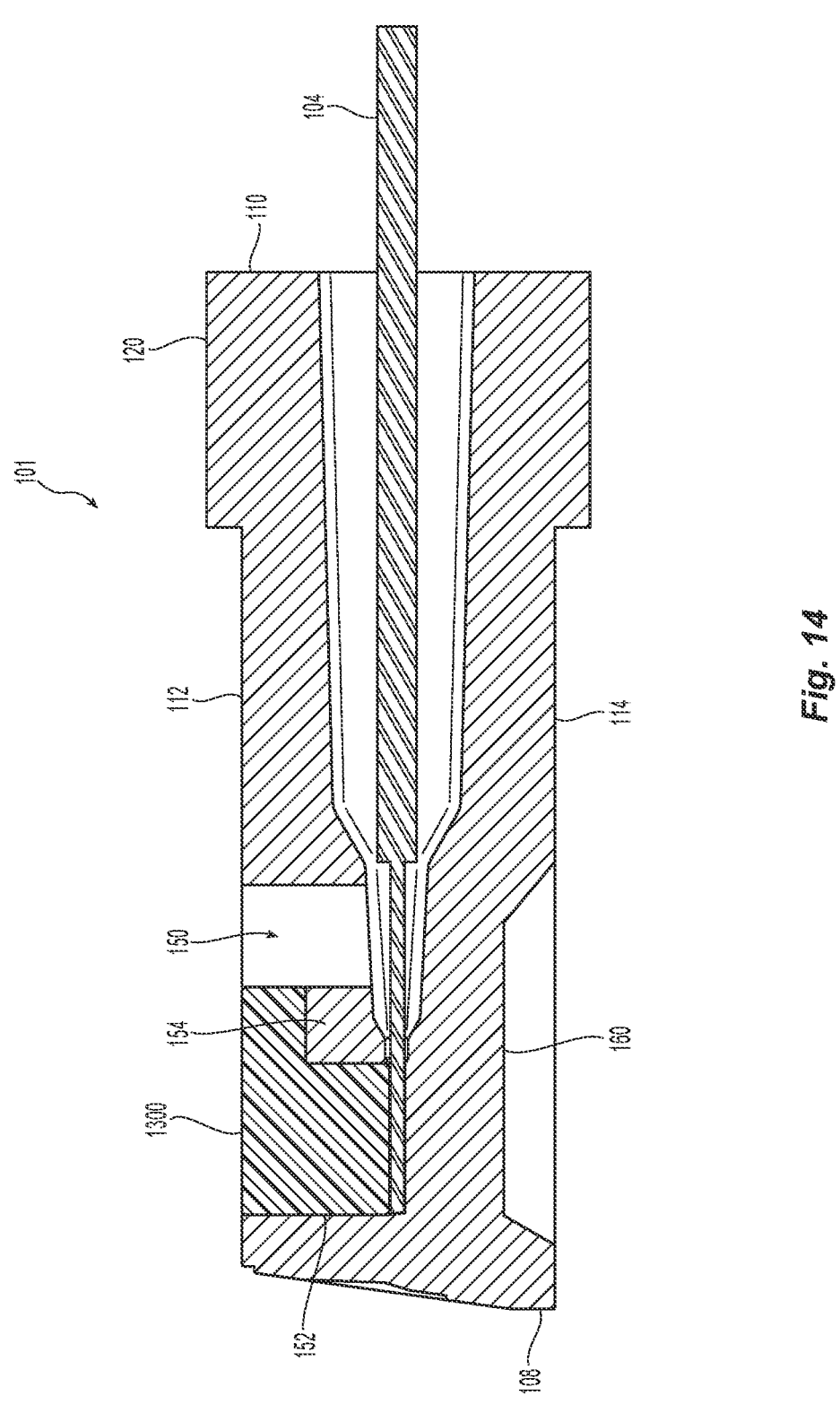
FIG. 14 is a cross sectional view of the fiber optical ferrule in FIG. 13.

FIGS. 13 and 14 illustrate a plug 1300 that may be used to press down upon the epoxy in the fiber optic ferrule 100 or the fiber optic ferrule 200. The plug 1300 secures the optical fibers 104 further into the fiber support structures 102, and also prevents dust or debris from entering the second window 152, although, the plug could be shaped to completely cover the first window 150 and the second window 152 upon termination of the fiber optic ferrule 100 or the fiber optic ferrule 200. The perimeter of the plug 1300 is accordingly matched to the second window 152 in FIG. 13. Further, the plug 1300 may be removable for inspection by a user.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An optical fiber support structure for an optical fiber comprising:
   a substrate having a groove configured to receive the optical fiber and running lengthwise between a front end and a rear end in a direction generally parallel to the optical fiber; and
   at least two projections extending from the substrate and from the groove, each of said at least two projections including a surface to receive the optical fiber; wherein the surface is curved with a radius of curvature at least equal to that of the optical fiber and directed toward the groove, each projection of the at least two projections being at a same distance from the front end or the back end of the substrate.

2. The optical fiber support structure according to claim 1, wherein the at least two projections comprise six projections, the projections being spaced from one another in a lengthwise direction, a lateral direction, or both.

3. The optical fiber support structure according to claim 1, wherein the at least two projections comprise three projections and they are located about the groove at a same location lengthwise on the substrate.

4. The optical fiber support structure according to claim 1, wherein the at least two projections are located at a distal end of the substrate.

5. A fiber optic ferrule for receiving a plurality of optical fibers in a plurality of optical fiber support structures comprising:
   a main body extending between a front end and a rear end, the main body having a top surface and a bottom surface;
   a longitudinal axis extending between the front end and the rear end and parallel to the plurality of optical fiber support structures;
   the plurality of optical fiber support structures being disposed in the main body, each of the plurality of optical fiber support structures have a groove and being generally parallel to the longitudinal axis of the fiber optic ferrule and each being configured to receive an optical fiber; and
   a plurality of fiber openings, a respective one of the plurality of fiber openings is aligned with a respective one of the plurality of optical fiber support structures and rearward thereof, each of the plurality of fiber openings having a tubular configuration to accept the optical fibers insertable from the rear end of the ferrule and onto a respective one of the plurality of optical fiber support structures, wherein each of the grooves includes at least two projections extending from the groove, each of said at least two projections including a surface to receive the optical fiber.

6. The fiber optic ferrule according to claim 5, wherein the at least two projections are disposed at a front end of each of the plurality of optical fiber support structures.

7. The fiber optic ferrule according to claim 5, further comprising a chamfered surface for each of the plurality of optical fiber support structures disposed between respective ones of the fiber openings and each of the plurality of support structures.

8. The fiber optic ferrule according to claim 5, wherein the at least two projections have a curved surface directed into the groove.

9. The fiber optic ferrule according to claim 8, wherein the curved surface on each of the at least two projections have a curvature that is the same as that of the optical fiber.

10. The fiber optic ferrule according to claim 5, wherein the at least two projections comprise six projections.

11. The fiber optic ferrule according to claim 5, wherein the plurality of fiber openings are disposed rearwardly of the plurality of optical fiber support structures and they are separated from one another by a distance between them.

12. The fiber optic ferrule according to claim 11, wherein there is a space between the plurality of fiber openings and the plurality of optical fiber support structures to receive epoxy therein.

13. A fiber optic ferrule made of an optically clear material comprising:
   a main body of optically clear material extending between a front end and a rear end, the main body having a top surface and a bottom surface;
   a plurality of optical fiber support structures in the main body and having a longitudinal axis extending between the front end and the rear end and parallel to the plurality of optical fiber support structures;
   each of the plurality of optical fiber support structures further comprising a groove in the optically clear material, each of the grooves configured to receive optical fiber therein, each of the grooves running lengthwise between the front end and rear end and at least two projections provided at a front end of each of the grooves, each of said at least two projections extending from the groove and including a surface to receive the optical fiber; wherein the surface is curved with a radius of curvature at least equal to that of the optical fiber and directed toward the groove.

14. The fiber optic ferrule according to claim 13, further comprising an opening in the top surface to provide access to the plurality of optical fiber support structures.

15. The fiber optic ferrule according to claim 13, further comprising a chamfered surface for each of the plurality of support structures disposed between respective ones of the fiber openings and each of the plurality of optical fiber support structures.

16. The fiber optic ferrule according to claim 13, wherein there is a space between the plurality of fiber openings and the plurality of optical fiber support structures to receive epoxy therein.

17. The optical fiber support structure according to claim 1, wherein the groove is an open-top groove having at least two projections.

* * * * *